E. H. SMYTHE.
RECEIVING APPARATUS FOR ELECTROMAGNETIC WAVES.
APPLICATION FILED JULY 24, 1906.
974,838.
Patented Nov. 8, 1910.
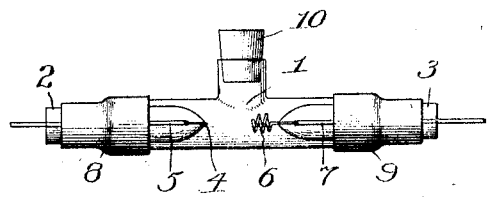
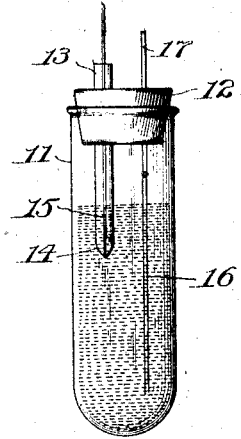
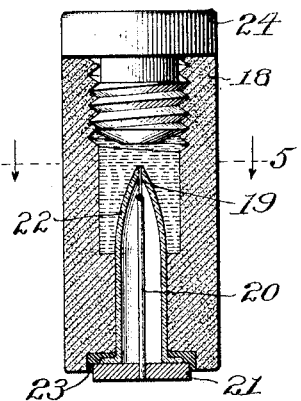
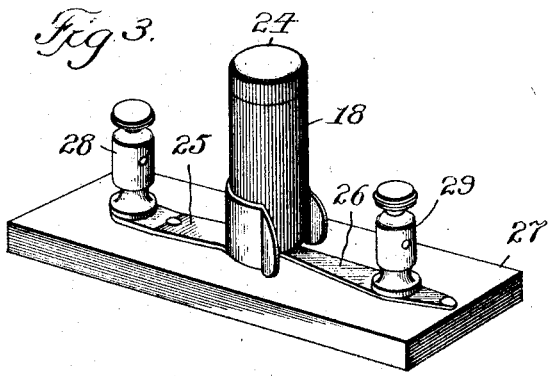
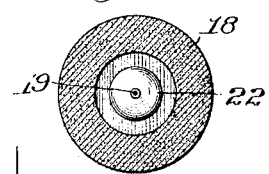
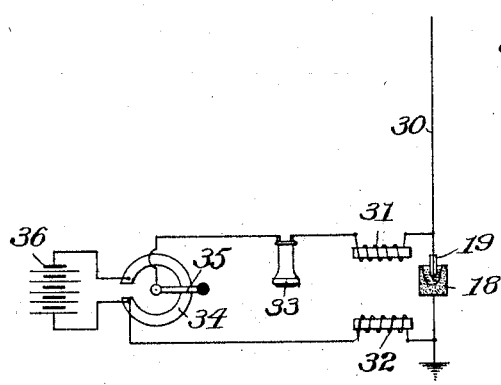
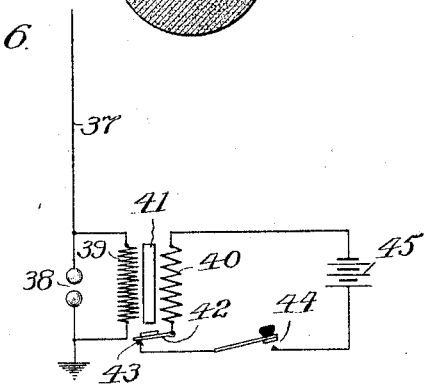
Witnesses:
George P. Barton
Louis B. Erwin
Inventor:
Edwin H. Smythe

UNITED STATES PATENT OFFICE.

EDWIN H. SMYTHE, OF CHICAGO, ILLINOIS.

RECEIVING APPARATUS FOR ELECTROMAGNETIC WAVES.

974,838.  Specification of Letters Patent.  Patented Nov. 8, 1910.

Application filed July 24, 1906. Serial No. 327,485.

*To all whom it may concern:*

Be it known that I, EDWIN H. SMYTHE, a citizen of the United States, residing at Chicago, in the county of Cook and State of Illinois, have invented certain new and useful Improvements in Receiving Apparatus for Electromagnetic Waves, of which the following is a specification.

My invention has to do with apparatus adapted to respond to the infinitesimal electric currents set up in a conductor by the passage of the electromagnetic or Hertzian waves which constitute the medium for the transmission of energy in wireless or space telegraphy.

My invention more particularly has to do with a receiving device or responder adapted to indicate the passage of oscillatory currents by their effect upon the action taking place in a small electrolytic cell, the opposition exerted by the counter electromotive force or polarization of the cell being effected by the oscillatory currents to vary the flow of current in a local circuit in which the cell and an electrical indicating device are included.

When two conductors are introduced into an electrolyte, a chemical action takes place that causes the liberation, at the surfaces where the electrodes and electrolyte are in contact of the elements into which the electrolyte is decomposed by the passage of the current. When the electrodes are of a material which is not chemically acted upon by the products of the electrolytic action liberated at their surfaces, and the electrolyte is not adapted to dissolve these products, they accumulate upon the active surface of the electrodes and set up an electromotive force that is opposed to the electromotive force of the current flowing in the local circuit. They also tend to insulate the surface of the electrode from the electrolyte, and thus further, and in a different way, diminish the flow of current in the local circuit. Such, for instance, is the action in the case of the electrolytic cell made up of two platinum electrodes immersed in acidulated water. When a current from a local battery is caused to flow through this cell, hydrogen gas is liberated at the cathode, and oxygen gas is liberated at the anode. These gases adhere to the surfaces of the electrode where they are disengaged, and serve both to set up a counter electromotive force opposed to the electromotive force of the local battery, and to insulate the surfaces of the electrodes from the electrolyte, both effects contributing to diminish the flow of current in the local circuit. If the polarization layer of gas be removed in any way from one or both of the electrode surfaces, the resistance of the device to the flow of the local current is reduced; but the augmented current, thus permitted to flow, immediately serves to reestablish the polarized condition of the device and again diminish the current flow. Such an electrolytic or polarization cell may be employed as a detector of Hertzian waves in wireless or space telegraphy by reducing the size of one of the electrodes, so that the contact area between the exposed surface of the electrode and the electrolyte is so restricted as to concentrate the energy of the infinitesimal currents produced by the Hertzian waves, and thus render the currents effective to modify the degree of polarization of the electrode. The modified polarization cell may be placed under the influence of the electromagnetic waves by arranging a conductor so that it will be cut by the waves, and connecting it with the polarization cell, so that the oscillatory currents set up in it by the passage of the waves may pass through the cell, superposed upon the steady current of the local battery in circuit with which the cell is also included.

The effect of the passage of the oscillatory current through the cell is apparently to alter the rate at which the electrolytic gas is evolved at the small electrode surface. If the surface is completely covered with a polarization layer of gas, the oscillatory impulse causes a portion or all of the layer to be thrown off, thus neutralizing the counter electromotive force and insulating effect of the layer, enabling the electrode and electrolyte momentarily to come into direct contact, and permitting a larger flow of current in the local circuit until the polarizing film of gas is reëstablished. If the surface is not completely enveloped by the polarization layer, the evolution of gas consequent upon the passage of the oscillatory impulse may cause an additional insulation of the surface from the electrolyte, and, as a result, a lessened flow of current in the local circuit. It therefore happens that in the employment of such a device as a wave detector in space telegraphy, at times the received impulses cause an increase in the resistance of the device, while again the effect is to produce a decrease of resistance, the latter effect being the one which seems to occur more often. Whether the effect be one of increase or of decrease of resistance, however, the result in either case is that the passage of the electromagnetic waves disturbs the unstable electrical equilibrium of the cell, and is indicated in the receiving device, included together with the cell in the local circuit, by the change in the current flow therein.

In my experiments with polarization cells as wave detectors in wireless telegraphy, I have found that, in addition to the electrolytic action which results in the formation of the polarization layer and is essential to the proper operation of the device, there is a secondary detrimental electrolytic action as the result of which the material of one of the electrodes is slowly dissolved and deposited upon the other electrode. Where the operativeness of the device as a detector of oscillatory currents depends, as it does in the case of the cell referred to above, upon one of the electrodes having a very small area exposed to the electrolyte, it will be seen that this dissolving of the material of one electrode and its deposition upon the other electrode is equally prejudicial to the best operation of the device, whether the small electrode be made the anode or the cathode of the cell. When the small electrode is made the anode, the wasting away of the material under the influence of the electrolytic action is sufficiently rapid to necessitate a frequent feeding of the electrode into the electrolyte in order that a new surface may be exposed as the old is eaten away. When the small electrode is made the cathode or negative electrode, the deposition upon it of material from the positive electrode, not only increases its area to the point where the oscillation is not sufficiently concentrated to be effective, but also alters the character of the surface so that a proper polarization of the electrode cannot be attained. Moreover the electrolyte itself may contain substances which, in the course of the action, are deposited upon the small negative electrode, thus rendering it insensitive. Where the electrodes are of platinum, this action, it is true, is very slight, and would be unimportant if it were not for the fact that the amount of material in the active portion of the small electrode is necessarily very minute, in order, as has been pointed out, that the area exposed to the electrolyte may be as restricted as possible. Where the electrodes are of platinum, and the electrolyte is a substance with respect to which platinum is ordinarily inert, it would be expected that no electro-deposition would take place; but this, I find, is not the case. On the other hand, I have observed the formation of a deposit transferred from the positive electrode, consisting of an ordinary platinum wire, to the negative electrode when the electrolytic medium between them consists of nothing more than pure water. The deposit which covers the small electrode after it has been employed for a time as the cathode of the cell is often of a character which it is difficult to detect, even with a high power microscope, yet its effect upon the responsiveness of the device when it has once formed is such that it is commonly supposed that the electrolytic cell is non-reversible,—that is, that it possesses the power of responding to the oscillatory impulses only when the small electrode is made to serve as anode. I have found that by preventing this action there is no wasting away of the small electrode when it is employed as anode, nor any deposit upon it of an insensitive coating when it is made to serve as the cathode of the cell, so that the device is made not only constant and permanent in its operative capacity, but sensitive and efficient as well. As the effect of electrolytic action is to dissolve the material of the anode and deposit it upon the cathode, I prevent this detrimental transfer of material preferably by making the anode of carbon, or like non-depositable material, and exercising care to eliminate all depositable material from the electrolyte. When this is done the exposed surface of the small electrode remains unaltered, even after prolonged operation, and the response of the device to the oscillatory currents is constant and uniform at all times.

I will describe my invention more particularly by reference to the accompanying drawing wherein—

Figure 1 is a view of a simple form of detector responsive to oscillatory current; Fig. 2 is a view of another form of detector embodying my invention; Figs. 3, 4, and 5 are perspective, and enlarged sectional elevation and sectional plan views, respectively, of a third form of responsive device constructed in accordance with my invention; Fig. 5 being a section on the line 5—5 of Fig. 4; and Fig. 6 is a conventional representation of a simple receiving circuit wherein the responsive device of my invention is adapted to be included, and of a simple sending circuit for producing the electromagnetic waves to which the receiving device is responsive.

In the form illustrated in Fig. 1 the detector comprises a receptacle in the form of a glass T-tube 1, into one arm of which one electrode 2 projects, while the other electrode 3 projects into the receptacle by the way of its other arm. The electrode 2 comprises, in the present instance, a short length of glass tube, the inner end of which is closed and sealed about a short length of very small platinum wire 4, the wire being cut off short at the end which penetrates the tube, so that the area exposed is approximately the area of the cross section of the wire. The end of the wire 4 within the tube may be connected as shown, to a length of larger wire 5 which extends out through the open end of the tube 2, and with which electrical connection with the electrode 4 may be completed. The other electrode comprises, in the present instance, a short length of platinum wire 6, which may be of larger gage, sealed into the closed end of the tube 3, and having its projecting end, if desired, coiled into a helix as shown. The end of the platinum wire 6 within the tube 3 may be connected to a leading-in wire 7 which is extended out through the open end of the tube 3, and through the medium of which electrical connection may be completed with the electrode 6. The joints between the glass tubes 2 and 3 and the arms of the receptacle 1 may conveniently be sealed by short lengths of rubber tube 8 and 9, while the stem of the tube 1, through which the electrolyte is adapted to be introduced, may be closed by a stopper 10. In practice, I have found that good results may be obtained by making the electrode 4 of platinum wire one one-thousandth (0.001) of an inch in diameter, while the electrode 6 may be of larger platinum wire, say, No. 32 gage, and sufficiently long to project far enough beyond the sealed end of the tube 3 to give a fairly large area exposed to the electrolyte.

The form of detector illustrated in Fig. 2 comprises a receptacle 11, shown as a test tube into the open end of which a stopper 12 bearing the two electrodes is inserted. One of the electrodes consists of a glass tube 13 into the closed end of which a small platinum wire 14 is sealed and cut off short so as to leave a very restricted area exposed at the end of the tube, while a conducting wire 15 may be connected with the small platinum wire 14 and extended out through the open end of the tube 13 to serve as a medium for the electrical connection of the electrode 14 with the external circuit. The other electrode consists, in the present instance, of a stout carbon filament 16, sealed to a wire 17 which communicates with the external circuit. As in the case of the small electrode of the device illustrated in Fig. 1, the electrode 14 in the present arrangement may consist of platinum wire one one-thousandth of an inch in diameter.

The form of detector illustrated in Figs. 3, 4, and 5 is designed more particularly to meet the requirements of practical service, although the principle involved is the same as that described in the foregoing. One of the electrodes, 18, is in the form of a cup or hollow cylinder of graphite or carbon, and is thus adapted to serve as a receptacle for the electrolyte as well as an electrode. The upper portion of the cylinder is bored out to form a receptacle for the electrolytic liquid, while the lower part has an axial bore to receive the other electrode. The other electrode consists of a glass stem 22, the upper end of which is closed and sealed about the electrode proper, which consists of a length of small platinum wire 19 cut off short where it penetrates the stem so that a very small area is exposed to the electrolyte. The inner end of the platinum wire 19 may be fused to a length of larger wire 20 which extends through the stem and is connected with a metallic terminal plate 21 at the outer end of the stem. The lower portion of the cup is sealed and the stem 22 with its associated parts secured in place by a sealing and insulating substance 23 that is introduced about the stem in a recessed portion at the bottom of the cup. In order to close the upper end of the electrode-receptacle 18, a screw-threaded plug 24 may be employed, the plug preferably being of the same material as the receptacle itself.

Thus constructed, the detector is a unitary structure provided with contact parts on its exterior by means of which connection may readily be made with the two electrodes, while it is closed in such a manner that it may receive rough usage without disarranging its parts. It may, for instance, be connected with the external circuit of the receiving station through the medium of a connecting device such as is illustrated in Fig. 3, this device consisting of two connecting clips 25 and 26 of spring metal mounted upon an insulating base 27, and provided with contact posts 28 and 29 to which the wires of the receiving circuit may be connected. When the detector is placed in position in the connecting device, as shown in Fig. 3, the clip 25 makes contact with the outside of the carbon cup 18, while the clip 26 exerts an upward tension against the contact plate 21, thus completing connection between the electrodes of the detector and the binding posts 28 and 29. It is apparent, of course, that the connection of the electrodes of the detector illustrated in Fig. 4 with the external circuit may be completed in a great variety of forms, others of which will readily suggest themselves.

As the electrolytic medium in the various forms of detector illustrated and described, a great many different substances may be employed. To realize most fully the advantages of my invention the electrolytic medium should be of a nature which is incapable of operating under the influence of the action to which it is subjected to separate out upon the electrodes any substances which may act injuriously upon them, either by dissolving them or depositing upon them any substances apt to destroy their sensitiveness to the oscillatory currents. I have found that pure nitric acid and pure sulfuric acid, either concentrated or diluted with water, give good results. Both of these acids are powerful oxidizing agents, and it is probably due to the normal depolarizing effect they exert upon the small electrode, when it is made the negative, that the effect of the oscillatory impulse is sometimes to increase the resistance of the cell,—the oscillation serving momentarily to increase the polarization against the normal depolarizing tendency of the acid.

In the type of detector illustrated in Fig. 2 and in Figs. 3, 4, and 5, I preferably use as the large electrode pure graphite or carbon, and in order to insure its being free of any depositable or platable substances, capable of being transferred to the small electrode to the detriment of its sensitiveness, I subject the carbon electrode to a careful treatment with aqua regia or other like substances capable of dissolving and removing such deleterious depositable substances, and, if necessary, get rid of the final traces of such substances by causing current to flow for a time from the carbon electrode to an auxiliary carbon cathode through the electrolyte which is to be employed, the auxiliary electrode being removed before the device is subjected to actual operation.

As a substance for sealing the glass stem 22 into the base of the carbon receptacle and electrode 18, I have found it convenient to employ pure sulfur, which is inert with respect to such electrolytes as I ordinarily employ in this type of detector. I have found that pure graphite or carbon gives good results as a non-platable or non-depositable electrode, but I do not wish to limit myself to carbon as this element of the combination, as there are other materials possessing this characteristic available for use.

While I have shown the small electrode in each of the three forms of detector as consisting of a short length of very small platinum wire—say, one one thousandth of an inch in diameter—sealed into the end of a glass tube, and cut off short to expose an area equal approximately to the cross section of the wire, it is quite possible to construct the small electrode in other ways without departing from the principle of having an extremely restricted area exposed; as, for instance, by using a platinum wire of considerably smaller diameter, and permitting a greater length to project into the electrolyte. Nor is it necessary to employ platinum alone as material for the small electrode, as a number of other materials are available, and will readily suggest themselves. Such electrode material should, of course, be insoluble in the electrolyte, should not be affected detrimentally by the decomposition products of the electrolytic action, and should be capable of polarization. Carbon, I have found, serves well as the material for the positive electrode, when that electrode is the larger of the two.

In Fig. 6 I have illustrated a simple receiving circuit in which detectors or responders constructed in accordance with my invention may be employed, and a simple sending circuit adapted to produce the electromagnetic waves to which the receiving circuit is responsive. In the receiving circuit the responder is represented conventionally as a small electrode 19 extending into an electrolyte contained in the receptacle 18, which serves as the other electrode. It will be understood that this is merely a diagrammatic representation and may be assumed to signify any of the various forms of responder which have been shown and described. One of the electrodes of the responder is connected with the usual upright wire or antenna 30, while the other electrode is connected to earth, or, if desired, to a suitable capacity. The electrolytic cell or responder is also connected with a local circuit which includes the two retardation or choke coils 31 and 32, a telephone receiver 33—or any other suitable receiving device—and a rheostat 34 having an arm 35 adapted to be moved to vary the electromotive force of the current flow in the local circuit. The local battery 36 is connected to the two terminals of the rheostat, while the local circuit that includes the responder is connected, one side to one of the rheostat terminals and the other side to the rheostat arm 35.

The sending circuit is represented as including the usual upright wire or antenna 37 connected with one side of a spark gap 38 while the other side of the gap is connected to earth. The spark gap is also connected with the secondary winding 39 of an induction coil, the primary winding 40 of which is connected in the circuit which includes the normally closed switch contacts 43 of the induction coil armature 42, battery 45, and a switch or key 44 for controlling the flow of current in the circuit. When the key 44 is closed current from the battery 45 is permitted to flow in the circuit, and the alternate attraction and retraction of the armature 42 under the influence of the induction coil core 41 alternately makes and breaks the circuit, and induces a high potential current in the secondary 39 of the coil. This causes a succession of sparks to pass across the spark gap 38, setting up current surges in the antenna 37 which cause it to throw out the electromagnetic waves that are detected at the receiving station.

At the receiving station the electromagnetic waves propagated through the ether from the sending station cause oscillatory currents in the antenna 30, which flow through the responder or detector 18 and 19 to earth, these currents being confined to this portion of the local circuit by the choke coils 31 and 32, which serve as barriers to their passage. The arm 35 of the rheostat 34 has previously been adjusted in such a position that only such a fraction of the total electromotive force of the local battery 36 is applied to the local circuit as will serve approximately to balance the counter electromotive force of polarization of the electrolytic cell. The proper electromotive force to apply to the responder circuit varies with the varying materials which may be used as the electrodes and electrolyte of the cell. Generally speaking it is in the neighborhood of two volts. Where the detector is constructed in the manner illustrated in Figs. 2, 3, 4, and 5 of the drawing, it is connected in the receiving circuit so that the carbon electrode is anode and the small platinum electrode is cathode, the receiving circuit of Fig. 6 illustrating this arrangement. Any of the three forms of detector illustrated is capable of operating when connected in the circuit so that the small electrode is anode and the larger electrode is cathode; but this arrangement is, of course, open to the objection that the action is eventually interfered with by the wasting away of the small exposed area of the platinum. By making the small electrode the cathode and using an anode of non-depositable material, this objection is obviated, and the device is capable of efficient operation through an indefinite time.

With the responder connected as shown in Fig. 6 the local electromotive force normally balances the counter electromotive force of the electrolytic cell, and keeps it in its polarized condition. When the oscillatory impulse developed in the antenna 30 flows through the cell, it momentarily destroys or alters the polarization at the surface of the small electrode, and permits a corresponding variation in the electrical resistance of the device. This variation in resistance causes a varying current flow in the local circuit, which causes a corresponding sound in the telephone receiver 33, or effects the operation of any other electro-responsive device that may be included in the circuit. Immediately upon the cessation of the impulse the local electromotive force operates to reestablish the normal polarized condition of the responder, so that each impulse causes a separate indication in the telephone or other receiving device, no matter how rapidly these impulses follow each other.

I claim:

1. An electromagnetic wave detector comprising an electrolyte, and a cathode and an anode having a very small area and a relatively large area, respectively, exposed to said electrolyte.

2. An electromagnetic wave detector comprising an electrolyte, a cathode consisting of a minute wire having an area approximately the area of the cross section of said wire exposed to said electrolyte, and an anode having a relatively large area exposed to the electrolyte.

3. An electromagnetic wave detector comprising an electrolyte free from deleterious electro-depositable substances, a cathode having a very small area exposed to said electrolyte, and an anode of non-depositable material having a relatively large area exposed to the electrolyte.

4. An electromagnetic wave detector comprising a minute metallic cathode, a relatively large carbon anode, and an interposed electrolyte.

5. An electromagnetic wave detector comprising a minute platinum cathode and a relatively large carbon anode, and an interposed electrolyte free from deleterious electro-depositable substances.

6. An electromagnetic wave detector comprising an electrolyte free from electro-depositable substances, a cathode consisting of a very fine metallic wire having an area of exposure to said electrolyte approximately equal to the area of the cross section of the wire, and an anode composed of a non-depositable substance having a relatively large surface exposed to said electrolyte.

7. An electromagnetic-wave detector, comprising an anode in the form of a carbon cup, an electrolyte contained in said cup, said electrolyte being free of deleterious electro-depositable substances, and a cathode projecting into said electrolyte and having a very small area exposed thereto.

8. An electromagnetic-wave detector, comprising an electrode of non-depositable substance in the form of a cup adapted to contain an electrolyte, and another electrode adapted to project into the cup and to have a very small area exposed to electrolyte contained therein, said last mentioned electrode being supported upon said first mentioned electrode.

9. An electromagnetic-wave detector, comprising an electrode of non-depositable substance in the form of a cup adapted to contain an electrolyte, and another electrode projecting into the cup through the bottom thereof, said last mentioned electrode comprising a small platinum wire sealed into a glass stem and having a very small area exposed to the electrolyte contained in the cup.

10. An electromagnetic-wave detector, comprising one electrode in the form of a cup into the interior of which the other electrode projects, said electrodes being sealed together to constitute a unit, and a terminal for said last mentioned electrode carried upon the outside of said cup electrode.

11. An electromagnetic-wave detector.

comprising one electrode in the form of a cup into the interior of which the other electrode projects, said electrodes being sealed together to constitute a unit, a terminal for said last mentioned electrode carried upon the outside of cup electrode, and a holder for said unit comprising two connection terminals, one adapted to make contact with said cup and the other with the terminal of the other electrode carried upon the outside of said cup.

EDWIN H. SMYTHE.

Witnesses:
　C. E. JORDAN,
　L. MERRITT.